United States Patent [19]
Itoh

[11] Patent Number: 5,274,483
[45] Date of Patent: Dec. 28, 1993

[54] LIQUID CRYSTAL DISPLAY WITH CONDUCTIVE FILM ALONG THE EDGE OF ELECTRODES OF ONE SUBSTRATE AND BETWEEN DOT ELECTRODES OF THE OTHER SUBSTRATE

[75] Inventor: Nobuyuki Itoh, Nara, Japan

[73] Assignee: Sharp Kabushiki Kaisha, Osaka, Japan

[21] Appl. No.: 820,273

[22] Filed: Jan. 14, 1992

[30] Foreign Application Priority Data

Jan. 14, 1991 [JP] Japan .................... 3-014823

[51] Int. Cl.$^5$ ........................ G02F 1/1343
[52] U.S. Cl. ........................ 359/54; 359/87
[58] Field of Search ................ 359/54, 87

[56] References Cited

U.S. PATENT DOCUMENTS

| | | | |
|---|---|---|---|
| 4,712,874 | 12/1987 | Sekimura et al. | 359/68 |
| 4,728,176 | 3/1988 | Tsuboyama et al. | 359/79 |
| 4,818,078 | 4/1989 | Mouri | 359/87 |
| 4,824,213 | 4/1989 | Morokawa | 359/54 |
| 4,859,036 | 8/1989 | Yamanaka et al. | 359/87 |
| 4,906,072 | 3/1990 | Kaneko et al. | 359/87 |
| 5,000,545 | 3/1991 | Yoshioka et al. | 359/87 |
| 5,007,716 | 4/1991 | Hanyu et al. | 359/87 |
| 5,084,778 | 1/1992 | DeJule et al. | 359/87 |
| 5,092,664 | 3/1992 | Miyatake et al. | 359/54 |
| 5,124,826 | 6/1992 | Yoshioka et al. | 359/54 |

FOREIGN PATENT DOCUMENTS

| | | |
|---|---|---|
| 0062289 | 10/1982 | European Pat. Off. |
| 0324433 | 7/1989 | European Pat. Off. |
| 0381526 | 8/1990 | European Pat. Off. |
| 61-210325 | 9/1986 | Japan |
| 62-121424 | 6/1987 | Japan |
| 1-179915 | 7/1989 | Japan |
| 1-227126 | 9/1989 | Japan |
| 1-280724 | 11/1989 | Japan |

*Primary Examiner*—William L. Sikes
*Assistant Examiner*—Anita Pellman Gross
*Attorney, Agent, or Firm*—David G. Conlin; Robert F. O'Connell

[57] ABSTRACT

A liquid crystal display including first and second translucent substrates opposed to each other, first and second transparent electrodes formed on the opposite faces of the first and second substrates, orientation films formed on the opposite faces so as to cover the first and second transparent electrodes, a liquid crystal filled in a space between the orientation films, the first electrode being divided into a plurality of dot electrodes arranged in the row and column directions, and the second electrode being divided into a plurality of stripe electrodes arranged opposite to the dot electrodes of the first electrode in the row direction, a first conductive film for serially connecting the dot electrodes in each column, and a second conductive film provided along the longitudinal edge of the stripe electrode, wherein the first and second substrates are positionally set such that the second conductive film is opposed to concave portions formed between the dot electrodes in the row direction.

2 Claims, 9 Drawing Sheets

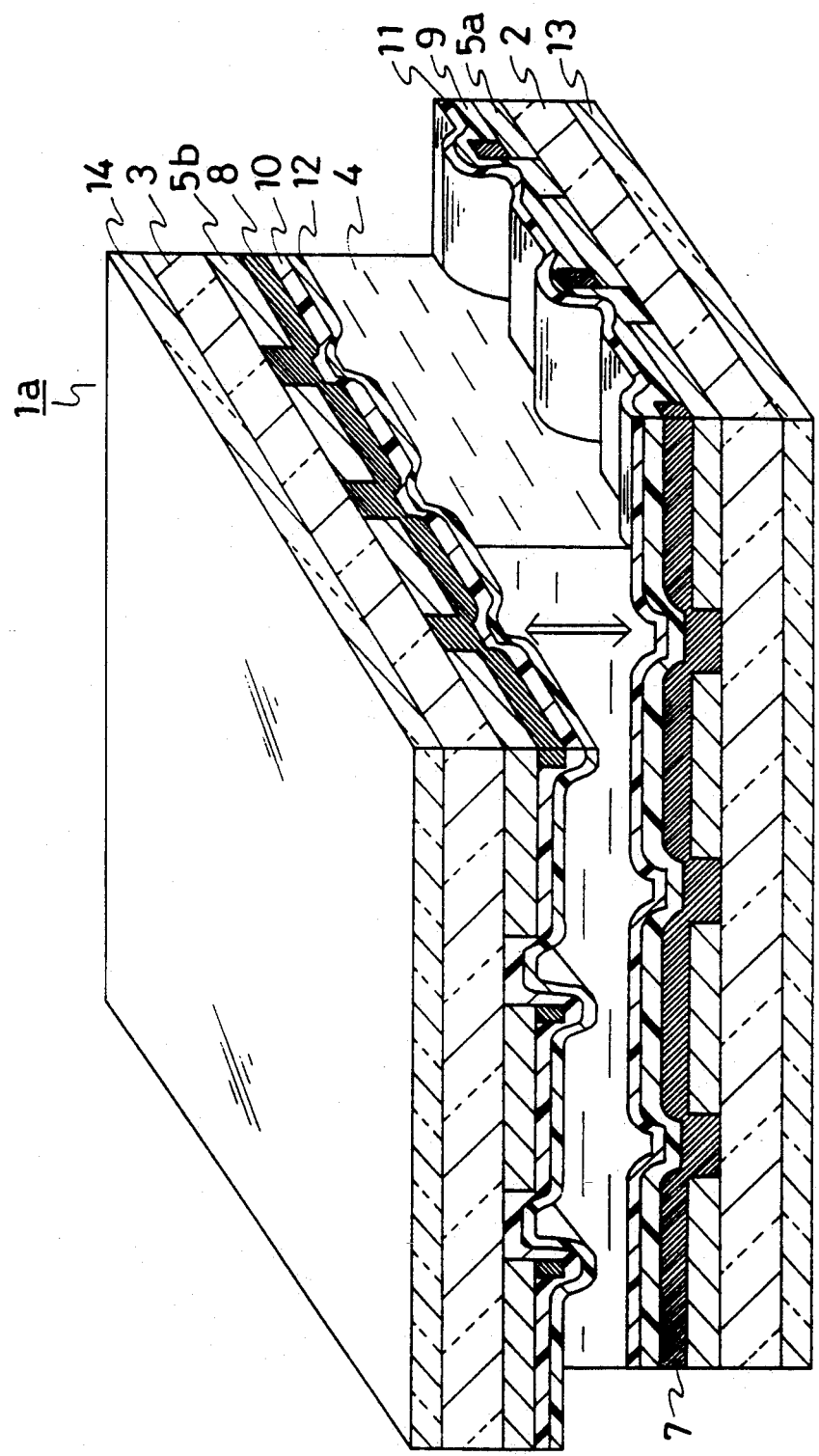

LIQUID CRYSTAL DISPLAY WITH CONDUCTIVE FILM ALONG THE EDGE OF ELECTRODES OF ONE SUBSTRATE AND BETWEEN DOT ELECTRODES OF THE OTHER SUBSTRATE

FIELD OF THE INVENTION

The present invention relates to a liquid crystal display using a ferroelectric liquid crystal, for example.

DESCRIPTION OF THE RELATED ART

With the development of information processing devices including computers as main item, display means have played an important part as means for transmitting information. A typical example of conventional display means is a CRT (cathode ray tube). Recently, a liquid crystal display has widely been utilized for the merit that its structure can be miniaturized and power consumption can be reduced. Furthermore, it is greatly desired that a liquid crystal display device having a larger display area and a larger capacity should be realized.

A liquid crystal display using a ferroelectric liquid crystal is the most potential to realize such desire. And the chiral smectic liquid crystal is normally used for the ferroelectric liquid crystal. In general, a ferroelectric chiral smectic phase takes a helical structure in molecular configuration. When being put into a thin cell, the helical structure is affected and comes loose by an interface. Consequently, with reference to FIGS. 10 (a), (b) and (c), liquid crystal molecules 18 form two domains, that is, a domain inclined from a smectic layer normal 17 by an angle of $+\theta 19$ and a domain inclined in the symmetrically opposite direction by an angle of $-\theta 20$ as shown in FIG. 10 (a). When a voltage is applied, there dominates one domain in which all molecules in spontaneous polarization are uniform, i.e., a molecular orientation becomes constant as a whole as shown in FIG. 10 (b). When a voltage having reversed polarity is applied, there dominates another domain in which all molecular orientations are constant in the symmetrically opposite direction to that of FIG. 10 (b) as shown in FIG. 10 (c). Thus, according to the voltage applied or reversely applied, an optical axis is changed or controlled. Consequently, a liquid crystal display can essentially be structured by addition of a polarizing plate.

Referring continually to the above-mentioned liquid crystal display, when an electric field is turned off, the molecular orientation set up before the turning off is held afterwards by the orientation regulating power of the interface as shown in FIG. 10 (d). Consequently, good memory effect can be obtained. In the case where a multiplex driving display having a high duty is desired to be carried out, the memory effect as noted is very effective.

There will be described a typical prior art with reference to FIG. 8. A pair of translucent or transparent substrates 21 and 22 each has stripe-shaped transparent electrodes 23 and 24 which are provided on their opposite faces. And in setting up these translucent substrates 21 and 22 opposite to each other, the transparent electrodes 23 and 24 are provided to form a matrix electrode structure. Orientation films 27 and 28 are layered on the transparent electrodes 23 and 24 with insulating films 25 and 26 inbetween. A ferroelectric liquid crystal 29 is filled between the translucent substrates 21 and 22. Polarizing plates 30 and 31 are provided on the outer surfaces of the translucent substrates 21 and 22. Thus, a ferroelectric liquid crystal display 32 is formed.

When the liquid crystal display of the prior art is driven, a voltage is applied to one end of the transparent electrode. In this case, when the electric resistance of the transparent electrode is great, the voltage is attenuated sharply on the other end of the transparent electrode. As a result, the voltage to be applied to a liquid crystal layer is made uneven. Consequently, the display characteristics of the liquid crystal display are made ununiform. To eliminate the above-mentioned drawback, there has been adopted a measure shown in FIG. 9 in which low-resistance conductive films 33 and 34 are provided in contact with the transparent electrodes in their longitudinal directions so that the electric resistance of the transparent electrodes is reduced. The low-resistance conductive films 33 and 34 are made of a metal or the like of which electric resistance is smaller than that of the transparent electrodes.

Referring to another problem included in a ferroelectric liquid crystal display according to the prior art, it is that the memory state in a picture element is inverted. That is, when an electric field is applied as shown in FIG. 10 (d), a switch is turned on as shown in FIG. 10 (b) and the electric field is then removed, the state shown in FIG. 10 (d) is returned instead of staying at FIG. 10 (b). There has been described that this phenomenon occurs owing to a reverse electric field which is generated by the spontaneous polarization of the ferroelectric liquid crystal [Yoshida et al; Collection of Papers Presented to 13th Liquid Crystal Symposium, 2Z15 (1987)). As the result of detailed studies, it has been found that the memory inversion is easily caused in the edge portion of the electrode (Japanese Unexamined Patent Publication No. H1-179915). It has been reported that low-resistance metallic wiring 33, 34 shown in FIG. 9 is effective in preventing the memory inversion. (Japanese Unexamined Patent Publication Nos. H1-179915, H1-280724 and the like).

In that case, however, a metal or the like wiring provided on the transparent electrode causes undesirable narrowing of the transparent portion or area of the electrode. Consequently, the active or utilizable aperture of the display is lowered. Further in this art, when the film thickness of the metal or the like is increased so that a line width is reduced in order to prevent the active aperture from being lowered, there is increased a possibility that electric contact is caused between upper and lower translucent substrates. Consequently, display grade is impaired. This is not an important problem for a TN liquid crystal display having a comparatively great cell thickness, but this is serious for a ferroelectric liquid crystal display which needs such a thin cell thickness as 0.5 to 4 $\mu$m, preferably 2 $\mu$m or less.

Stated in summary, in the liquid crystal display according to the prior art, the electrode resistance should be reduced by the low-resistance conductive film such as a metal or the like in order to make the display characteristics uniform. In addition, the active aperture is lowered in preventing the memory inversion. Consequently, there is increased a possibility that the electric contact is caused between the upper and lower transparent substrates. As a result, the display grade is lowered.

SUMMARY OF THE INVENTION

The present invention provides a liquid crystal display comprising first and second translucent substrates opposed to each other, first and second transparent electrodes formed on the opposite faces of the first and second substrates, orientation films formed on the opposite faces so as to cover the first and second transparent electrodes, a liquid crystal filled in a space between the orientation films, the first electrode being divided into a plurality of dot electrodes arranged in the row and column directions, and the second electrode being divided into a plurality of stripe electrodes arranged opposite to the dot electrodes of the first electrode in the row direction, a first conductive film for serially connecting the dot electrodes in each column, and a second conductive film provided along the longitudinal edge of the stripe electrode, wherein the first and second substrates are positionally set such that the second conductive film is opposed to concave portions formed between the dot electrodes in the row direction.

The present invention further provides a liquid crystal display comprising first and second translucent substrates opposed to each other, first and second transparent electrodes formed on the opposite faces of the first and second substrates, orientation films formed on the opposite faces so as to cover the first and second transparent electrodes, a liquid crystal filled in a space between the orientation films, the first and second electrodes being divided into a plurality of dot electrodes arranged in the row and column directions so as to be opposed to each other, a first conductive film for serially connecting the edges of the dot electrodes of the first electrode at each row, and a second conductive film for serially connecting the edges of the dot electrodes of the second electrode at each column, wherein the first and second substrates are positionally set such that the first conductive film is opposed to concave portions formed between the dot electrodes of the second electrode in the row direction and the second conductive film is opposed to concave portions formed between the dot electrodes of the first conductive film in the column direction.

BRIEF DESCRIPTION OF THE DRAWINGS

FIG. 2 is a section view of a liquid crystal display according to a second embodiment of the present invention;

DETAILED DESCRIPTION OF THE PREFERRED EMBODIMENT

Preferred embodiments of the present invention will be described in detail with reference to the drawings. The present invention should not be construed as being limited by the following embodiments.

EMBODIMENT 1

Figure 1:
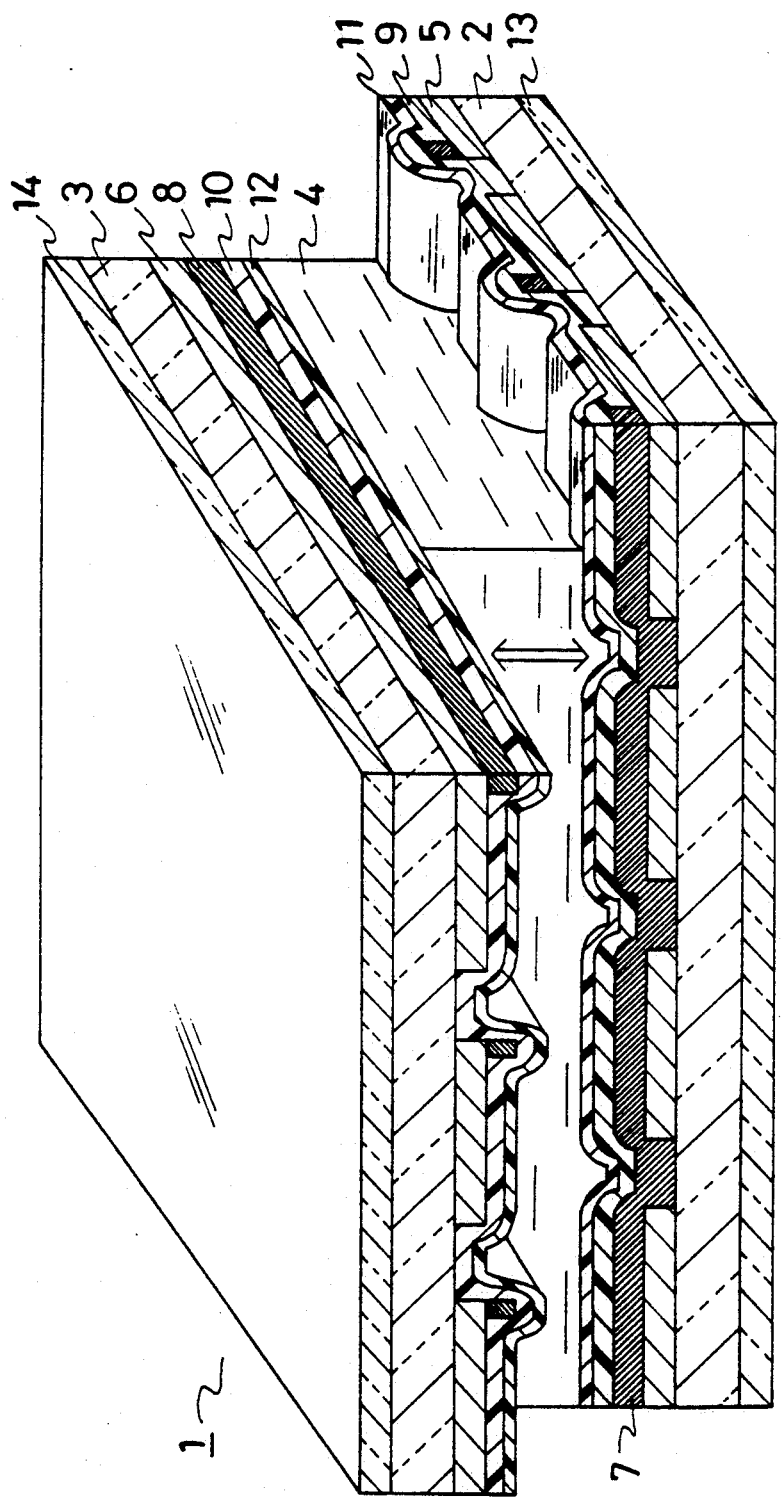
FIG. 1 is a section view of a liquid crystal display according to a first embodiment of the present invention.
Figure 3A:
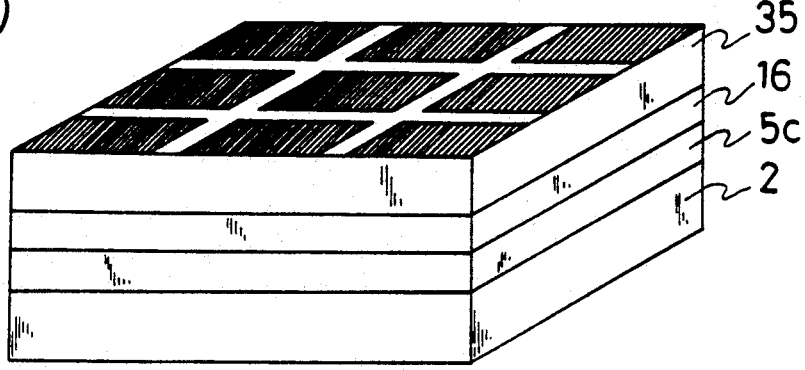
FIGS. 3 (a) to (f) are views showing the first half steps of forming a dot electrode and a low-resistance conductive film in the liquid crystal display according to the second embodiment of the present invention.
Figure 3B:
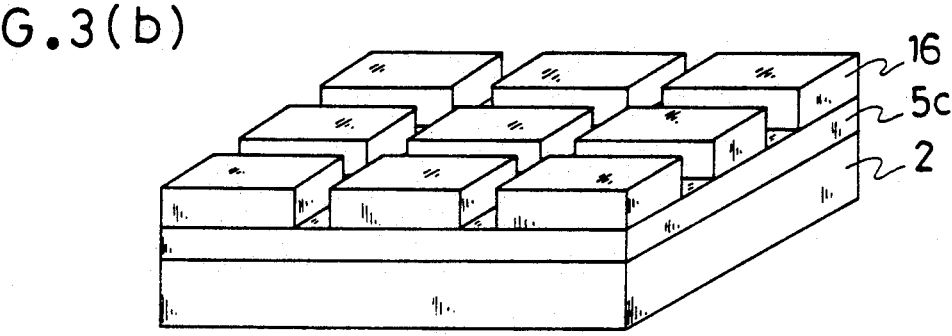
Figure 3C:
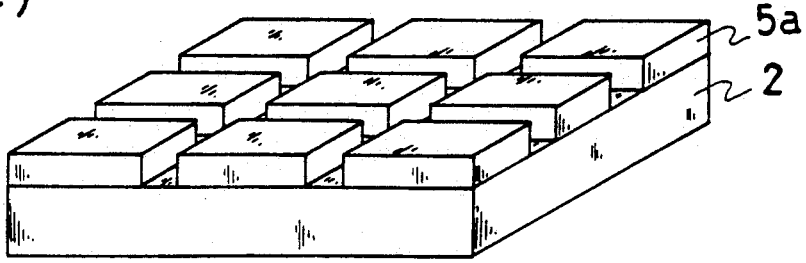
Figure 3D:
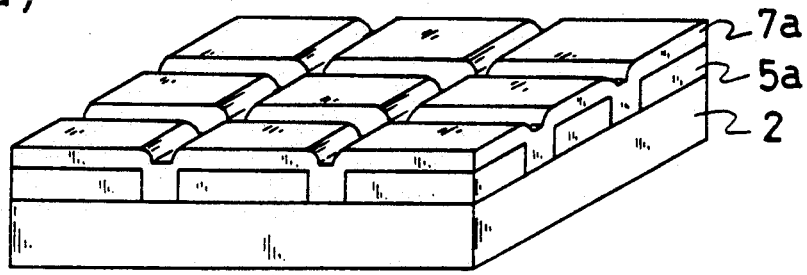
Figure 3E:
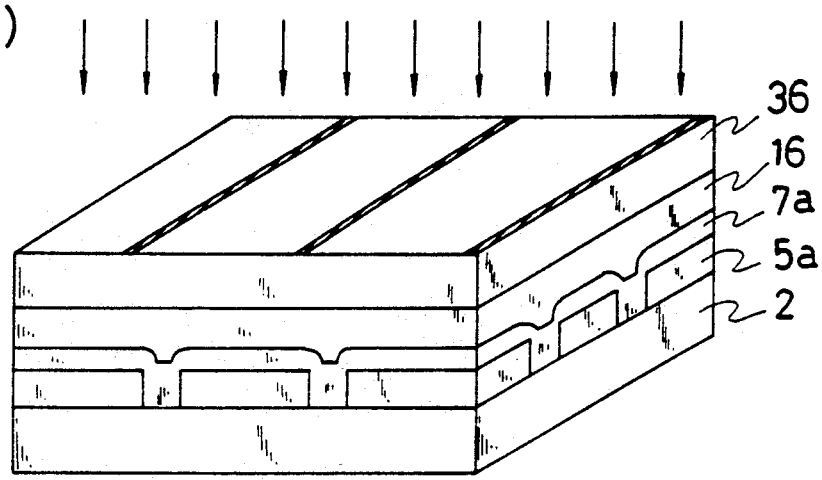
Figure 3F:
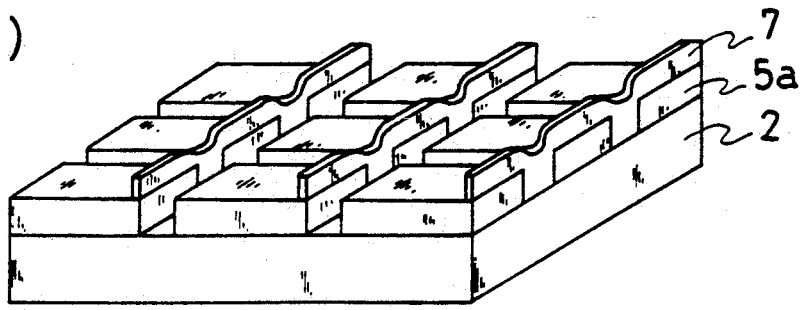

FIG. 1 is a section view showing the schematic structure of a liquid crystal display according to a first embodiment of the present invention. In FIG. 1, a ferroelectric liquid crystal display 1 comprises a pair of translucent substrates 2 and 3, dot electrodes 5, stripe transparent electrodes 6, low-resistance conductive films 7 and 8, orientation films 11 and 12, a ferroelectric liquid crystal 4, and polarizing plates 13 and 14. The translucent substrates 2 and 3 are provided opposite to each other. The dot electrodes 5 are transparent electrodes which are formed in a matrix on the surface of the translucent substrate 2 opposite to the translucent substrate 3. The stripe transparent electrodes 6 are formed in the row direction at equal spaces on the surface of the translucent substrate 3 opposite to the translucent substrate 2. The low-resistance conductive films 7 are provided along side edges on the surfaces of the dot electrodes 5 in the column direction and electrically connect the dot electrodes 5 respectively. The low-resistance conductive films 8 are provided along and in contact with side edges on the surfaces of the stripe transparent electrodes 6. The orientation films 11 and 12 cover the dot electrodes 5 and the stripe transparent electrodes 6 through insulating films 9 and 10, respectively. The ferroelectric liquid crystal 4 is filled between the translucent substrates 2 and 3. The polarizing plates 13 and 14 are provided on the outer surfaces of the translucent substrates 2 and 3, respectively.

The translucent substrates 2 and 3 are provided opposite to each other such that the low-resistance conductive films 8 on the stripe transparent electrodes 6 are positioned above trench portions between the dot electrodes 5. A typical example of the translucent substrates 2 and 3 is glass.

The dot electrode 5 and the stripe transparent electrode 6 are formed of an ITO film. Preferably, the thickness of the ITO film is 2000 Å. It is preferred that the low-resistance conductive films 7 and 8 are typically formed by depositing molybdenum with the use of a sputtering method, and have a thickness of 2200 Å and a width of 5 μm. The dot electrode 5 is a square having a side length of 55 μm. A space between the dot electrodes 5 is 10 μm.

EMBODIMENT 2

FIG. 2 is a section view showing the schematic structure of a liquid crystal display according to a second embodiment of the present invention. In FIG. 2, a ferroelectric liquid crystal display 1a comprises translucent substrates 2 and 3 such as glass. A ferroelectric liquid crystal 4 is filled between the translucent substrates 2 and 3. Dot electrodes 5a and 5b are provided as transparent electrodes on the opposite faces of the translucent substrates 2 and 3. The dot electrodes 5a and 5b are arranged in a matrix. Low-resistance conductive films 7 and 8 are formed so as to connect the edges of the dot electrodes 5a and 5b for each row and each column. On the low-resistance conductive films 7 and 8 are sequentially provided insulating films 9 and 10 and orientation films 11 and 12. The translucent substrates 2 and 3 are laminated as shown by an arrow in FIG. 2 such that the concave portions of the low-resistance conductive films 7 and 8 are opposed to each other in the outside direction of the translucent substrates 2 and 3, the low-resistance conductive films 7 are opposed to concave portions formed between the dot electrodes 5b in the row direction and the low-resistance conductive films 8 are opposed to concave portions formed between the dot electrodes 5a in the column direction. Polarizing plates 13 and 14 are provided as crossed nicols on the outer surfaces of the translucent substrates 2 and 3.

ITO and molybdenum are deposited as the dot electrodes 5a and 5b and the low-resistance conductive films 7 and 8 on the translucent substrates 2 and 3 by sputtering respectively, and are then etched so as to have a configuration shown in FIG. 2.

FIGS. 3 (a) to (f) are views showing steps of forming the dot electrodes 5a and 5b and the low-resistance conductive films 7 and 8 on the translucent substrates 2 and 3 in the liquid crystal display 1a according to the second embodiment. Only the case of the translucent substrate 2 is shown in FIGS. 3 (a) to (f).

As shown in FIG. 3 (a), an ITO film 5c is formed as a dot electrode 5 at a thickness of 2000 Å on a translucent substrate 2 by sputtering. A photoresist 16 is applied on the ITO film 5c. Then, temporary burning is carried out at a temperature of 90° C. Exposure is carried out by a high pressure mercury lamp with the use of a photomask 35 having a shape shown in FIG. 3 (a) so as to perform development. Thereafter, regular burning is carried out at a temperature of 120° C. Consequently, a photoresist is formed as shown in FIG. 3 (b).

Subsequently, etching is carried out for 4 minutes at a temperature of 35° C. by using a solution containing oxalic acid in an amount of 47%, so that squares shown in FIG. 3 (c) are obtained by patterning. As shown in FIG. 3 (d), a molybdenum film 7a is formed at a thickness of 2200 Å by sputtering. Then, the photoresist 16 is applied on the molybdenum film 7a in similar to the case of the ITO film 5c. Then, temporary burning is carried out. Exposure is carried out by means of a photomask 36 shown in FIG. 3 (e). Development and regular burning are sequentially carried out. Thereafter, etching is carried out for 3 minutes at a temperature of 25° C. by using a solution containing in an amount of 25% a mixture of $H_3PO_4$ and $HNO_3$ at a ratio of 5 to 1. Consequently, a configuration shown in FIG. 3 (f) is obtained by patterning. In this case, the side length of a dot electrode 5a is 55 μm, a space between the dot electrodes 5a is 10 μm and the line width of a low-resistance conductive film 7 is 5 μm.

$SiO_2$ (trade name: OCD TYPE-II manufactured by Tokyo Ohka Kogyo Co., Ltd.) is applied on the above-mentioned configuration by a spinner. Then, burning is carried out to form an insulating film 9. A solution containing methacresol in an amount of 1% of a Nylon 6 (manufactured by TORAY Co., Ltd.) is applied on the insulating film 9 by the spinner. Thereafter, burning is carried out to form an orientation film 11. These steps are not shown in FIGS. 3 (a) to (f).

Wrapping is applied on the orientation film 11 of the translucent substrate 2 thus formed and the orientation film 12 of a translucent substrate 3 processed in similar to FIGS. 3 (a) to (f) so as to become parallel or antiparallel. As shown by an arrow in FIG. 2, the low-resistance conductive films 7 and 8 on the dot electrodes 5a and 5b are aligned opposite to trench portions between the dot electrodes 5a and 5b in the row and column directions so as to have a cell thickness of 1.8 μm. Then, a ferroelectric liquid crystal 4 is injected and sealed. Thereafter, polarizers 13 and 14 are provided on the outer surfaces of the ferroelectric liquid crystal 4. Consequently, a liquid crystal display 1a shown in FIG. 2 is formed.

Referring to the above-mentioned liquid crystal display, the dot electrodes 5a and 5b are electrically connected to each other by the low-resistance conductive films 7 and 8 comprised of molybdenum of which electric resistance is smaller than that of the transparent electrode. Consequently, an image can be displayed by selectively applying a voltage in similar to a display using a conventional stripe electrode. A voltage to be applied is not attenuated on the dot electrodes 5a and 5b. A portion in which the low-resistance conductive films are opposed to each other has a long distance. Consequently, electric contact is not caused between upper and lower substrates. In addition, memory inversion is not caused on electrode edges. Thus, good display characteristics can be obtained all over a picture.

EMBODIMENT 3

Figure 4:
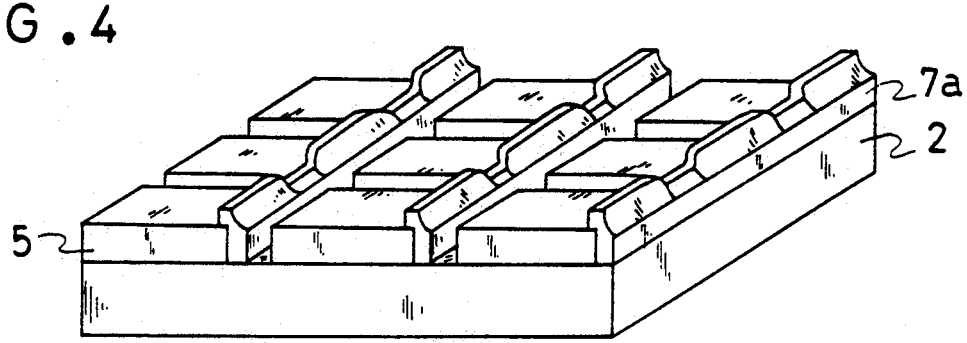
FIG. 4 is a perspective view showing the schematic structure of a substrate according to a third embodiment of the present invention.

FIG. 4 is a perspective view showing the schematic structure of a substrate according to a third embodiment of the present invention. A ferroelectric liquid crystal display according to the present embodiment is the same as in Embodiment 2 of FIG. 2 except that a low-resistance conductive film 7a comprised of molybdenum is formed at a thickness of 1100 Å on a transparent electrode so as to have a shape shown in FIG. 4. It is sufficient that the position of a photomask is shifted to manufacture the low-resistance conductive film 7a in FIG. 3 (e).

More specifically, the low-resistance conductive film 7a comes in contact with the side walls of dot electrodes 5 in trench portions therebetween. Thus, the low-resistance conductive film is formed over picture and non-picture element portions. Consequently, even if the line width and thickness of the low-resistance conductive film on the dot (picture element) electrode are made smaller than those of Embodiment 2, good display characteristics can be obtained in similar to Embodiment 2. Furthermore, the line width is reduced so that the active aperture of the display can be increased. Consequently, display having a higher contrast can be obtained.

EMBODIMENT 4

Figure 5:
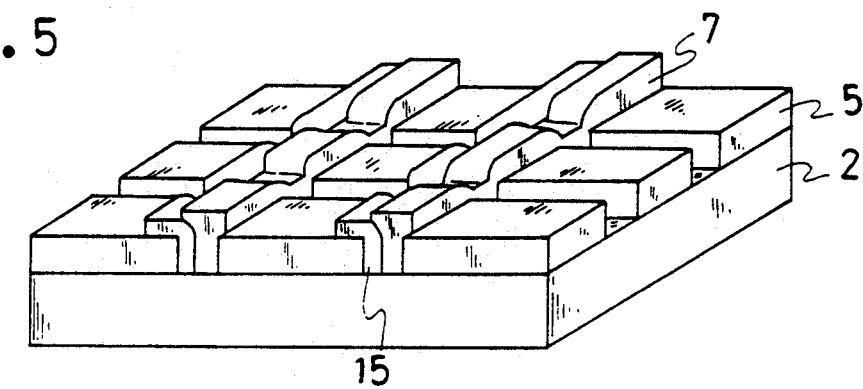
FIG. 5 is a perspective view showing the schematic structure of a substrate according to a fourth embodiment of the present invention.

FIG. 5 is a perspective view showing the schematic structure of a substrate according to a fourth embodiment of the present invention. In FIG. 5, a low-resistance conductive film 7 is provided in a trench portion between dot electrodes 5. Portions between columns or rows are completely isolated by an insulating film 15 such that the low-resistance conductive film 7 electrically comes in contact with the dot electrodes 5 in a column or row on one side and does not come in contact with the dot electrodes 5 on the other side. According to the present embodiment, a $Ta_2O_5$ film is formed at a thickness of 2000 Å by sputtering. Then, a resist pattern is formed by photolithography in similar to Embodiments 2 and 3. Thereafter, plasma etching is carried out by using $CF_4$ as a gas. Thus, the insulating film 15 is formed. Molybdenum is deposited at a thickness of 500 Å on the insulating film 15 so as to form the low-resistance conductive film 7 in similar to Embodiments 2 and 3. A cell is produced on the same conditions as in Embodiments 2 and 3 except for the foregoing. In this case, it is preferred that the insulating film 15 comprised of $Ta_2O_5$ bas a thickness of 2000 Å or more such that the low-resistance conductive film 7 comprised of molybdenum does not electrically come in contact with the dot electrode 5 comprised of ITO. The low-resistance conductive film 7 covers a non-electrode portion so that it has a line width of 11 μm. Consequently, it is sufficient that the low-resistance conductive film 7 has a thickness of 500 Å.

According to the present embodiment, good display characteristics can be obtained in similar to Embodiments 2 and 3. Furthermore, the low-resistance conductive film is formed so as to completely intercept the light in a non-picture element portion. Consequently, display in the non-picture element portion can be made uniform. Thus, display having a higher contrast can be obtained.

EMBODIMENT 5

Figure 6:
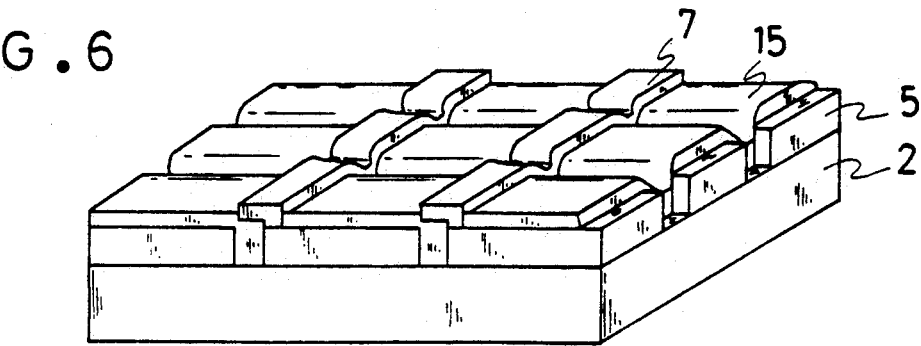
FIG. 6 is a perspective view showing the schematic structure of a substrate according to a fifth embodiment of the present invention.

FIG. 6 is a perspective view showing the schematic structure of a substrate according to a fifth embodiment of the present invention. In the present embodiment, a low-resistance conductive film 7 is provided by using an insulating film 15 in similar to Embodiment 4. The insulating film 15 is formed so as to almost cover the upper faces of dot electrodes 5 and to fill up trench portions between the dot electrodes 5. The low-resistance conductive film 7 comes in contact with the upper faces of the dot electrodes 5 which are not covered by the insulating film 15 in the row or column direction. Consequently, the dot electrodes 5 are electrically connected to each other. The structure of the present embodiment is the same as that of Embodiment 2 except for the structure of the substrate. The liquid crystal display has display characteristics having a good contrast in similar to Embodiment 2.

EMBODIMENT 6

Figure 7:
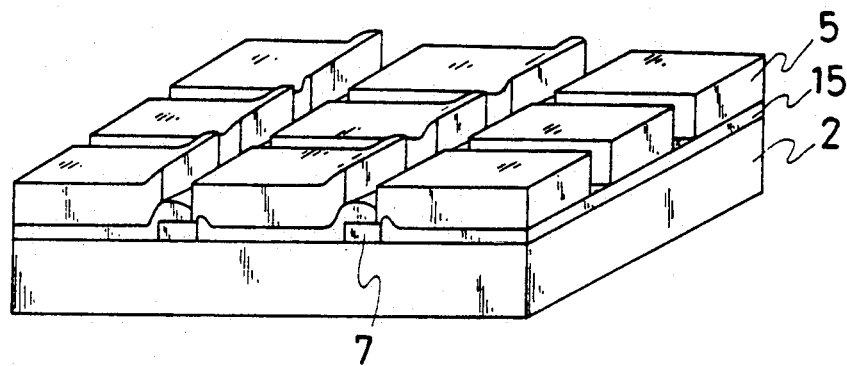
FIG. 7 is a perspective view showing the schematic structure of a substrate according to a sixth embodiment of the present invention.
Figure 8:
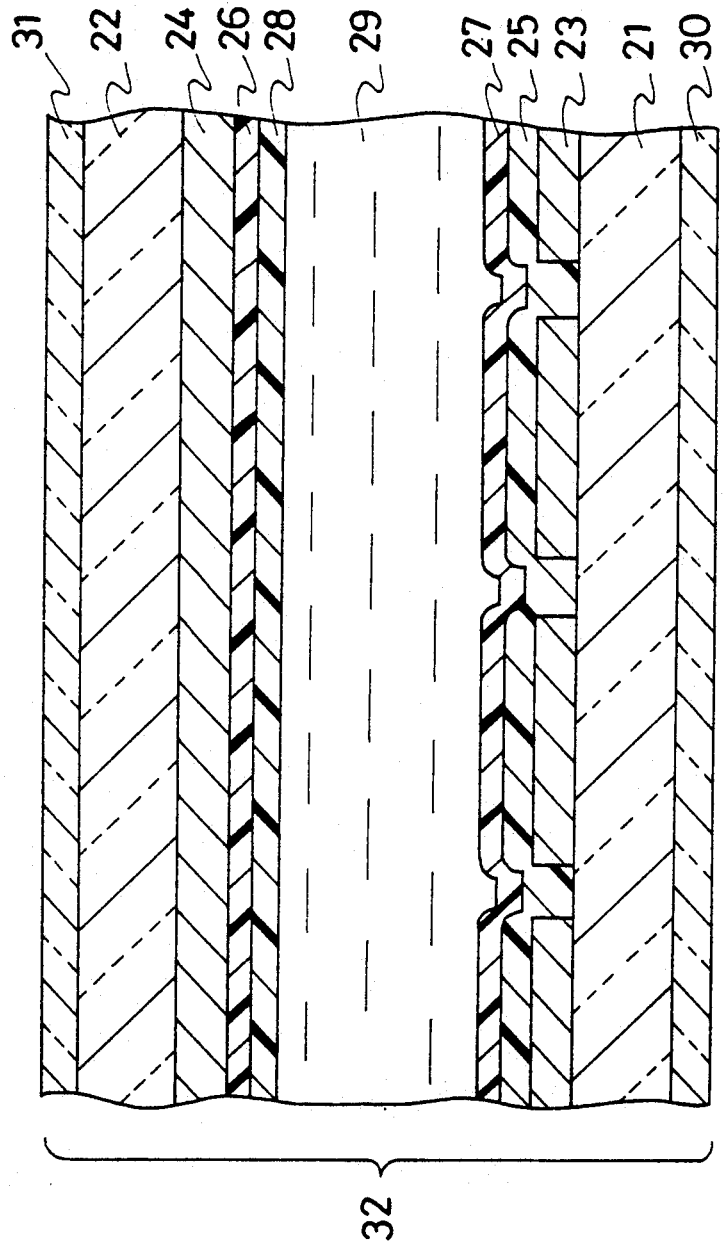
FIG. 8 is a section view of a liquid crystal display according to the prior art.
Figure 9:
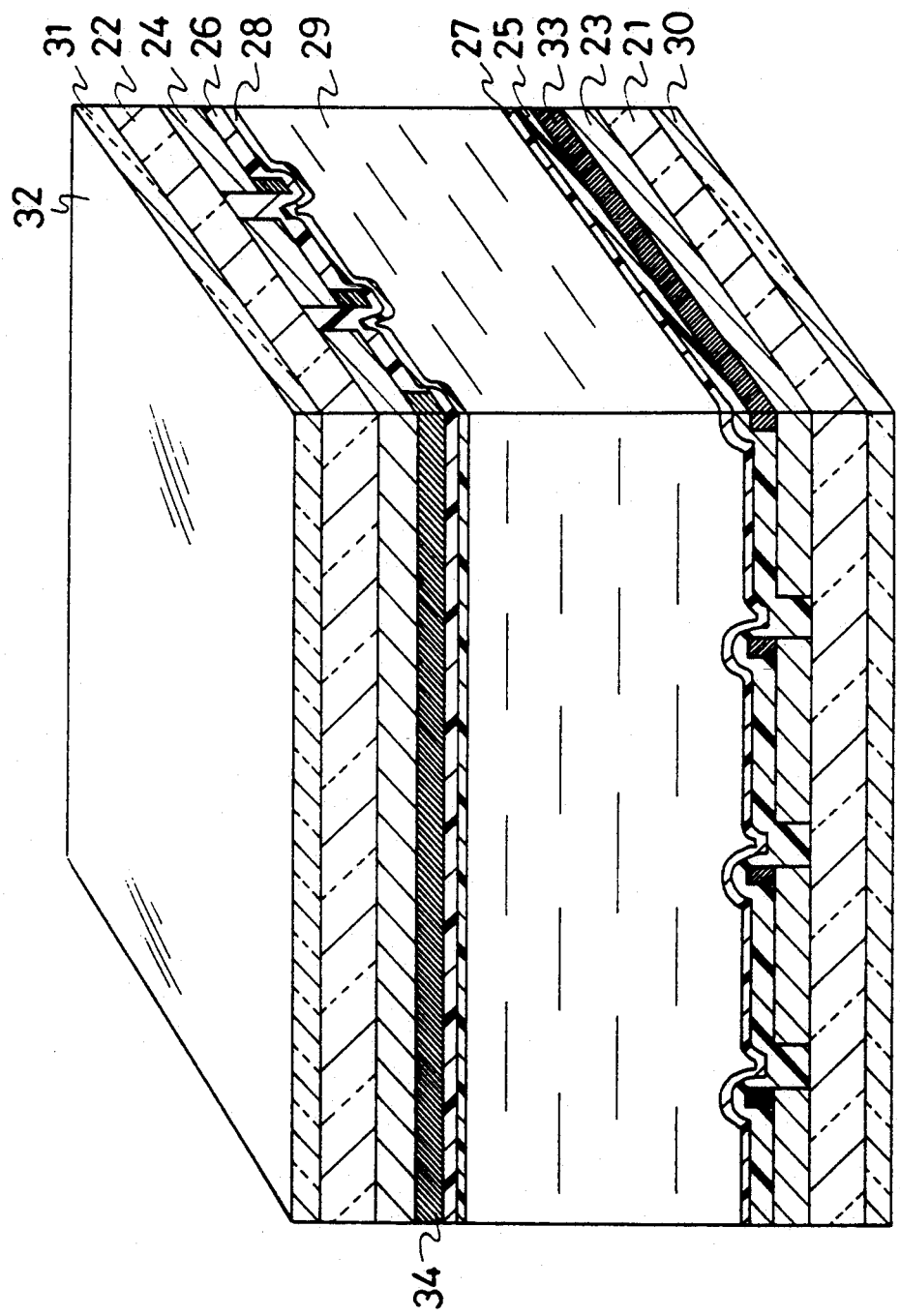
FIG. 9 is a section view of another liquid crystal display according to the prior art.
Figure 10A:
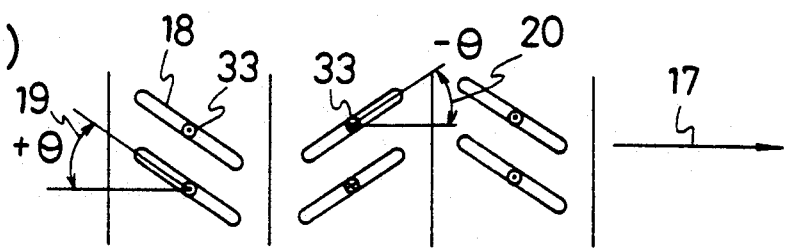
FIGS. 10 (a) to (d) are views showing the behaviors of ferroelectric liquid crystal molecules.
Figure 10B:
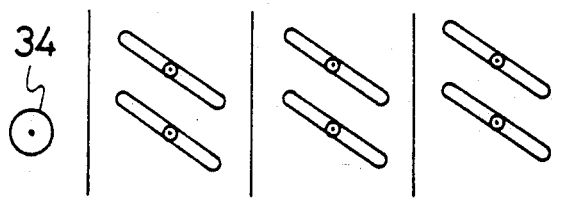
Figure 10C:
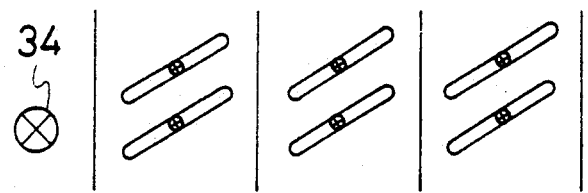
Figure 10D:
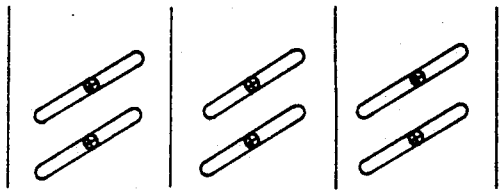

FIG. 7 is a perspective view showing the schematic structure of a substrate according to a sixth embodiment of the present invention. In FIG. 7, a low-resistance conductive film 7 is formed on a translucent substrate. Dot electrodes 5 are formed so as to electrically come in contact with the low-resistance conductive film 7 through an insulating film 15 at a column or row on one side. The structure of the present embodiment is the same as that of Embodiment 4 except for the foregoing. According to the liquid crystal display of the present embodiment, display characteristics having a good contrast can be obtained in similar to Embodiments 4 and 5.

According to Embodiments 1 to 6, molybdenum is used for the low-resistance conductive film. Even if aluminum, titanium, tantalum or the like is used in place of molybdenum, the same results can be obtained. In addition, even if $Al_2O_3$, ZnO, $Y_2O_3$, $SiO_2$, SiNx or the like is used for the insulating film 15 in place of $Ta_2O_5$, the same results can be obtained.

According to the present invention, the low-resistance conductive films are provided so as to electrically connect a plurality of dot electrodes arranged in a matrix in the row or column direction. Consequently, the low-resistance conductive film formed between the adjacent dot electrodes is positioned lower by the thickness of the dot electrode than the height of the low-resistance conductive film on the dot electrode. A cell is produced such that the low-resistance conductive film between the adjacent dot electrodes is opposed to the low-resistance conductive film on the opposite translucent substrate. Consequently, there can be reduced a possibility that the electric contact between the translucent substrates is caused. Furthermore, the thickness of the low-resistance conductive film can be increased. In addition, the width of the low-resistance conductive film can be reduced. Thus, the active aperture can be prevented from being decreased sharply.

What is claimed is:

1. A liquid crystal display comprising:
   first and second transparent substrates opposed to each other,
   first and second transparent electrodes formed on the opposite faces of the first and second substrates,
   orientation films formed on the opposite faces so as to cover the first and second transparent electrodes,
   a liquid crystal filled in a space between the orientation films, the first electrode being divided into a plurality of dot electrodes arranged in the row and column directions and having concave portions and formed between the dot electrode in the row direction, and the second electrode being divided into a plurality of stripe electrodes arranged opposite to the dot electrodes of the first electrode in the row direction,
   a first conductive film for serially connecting the dot electrodes in each column, and
   a second conductive film providing a ridge along the longitudinal edge of each of the stripe electrodes,
   wherein the first and second substrate are positioned so that ridges formed by the second conductive film are opposite the concave portions formed between the dot electrodes in the row direction to reduce the possibility of electric contact between the substrates.

2. A liquid crystal display comprising:
   first and second transparent substrates opposed to each other,
   first and second transparent electrodes formed on the opposite faces of the first and second substrates,
   orientation films formed on the opposite faces so as to cover the first and second transparent electrodes,
   a liquid crystal filled in a space between the orientation films, each of the first and second electrodes being formed as a plurality of dot electrodes having concave portions formed therebetween and being arranged in row and column directions so as to be opposed to each other.
   a second conductive film for serially connecting the edges of the dot electrodes of the second electrode at each column,
   wherein the first and second substrates are positioned so that the first conductive film forms a ridge opposite the concave portions formed between the dot electrodes of the second electrode in the row direction and the second conductive film forms a ridge opposite the concave portions formed between the dot electrodes of the first electrode in the column direction to reduce the possibility of electric contact between the substrates.

* * * * *